(12) United States Patent
Miedema et al.

(10) Patent No.: US 9,768,870 B2
(45) Date of Patent: Sep. 19, 2017

(54) AUTOMATIC CONFIGURATION OF NETWORK DEVICES IN A CLUSTER BASED ON PHYSICAL DEPLOYMENT

(71) Applicants: David J. Miedema, Ottawa (CA); Michael Watford, Kanata (CA); Xiaoqing Hu, Kanata (CA); Ross Caird, Kanata (CA); Rodd Lamarche, Ottawa (CA); Zenon Slodki, Ottawa (CA)

(72) Inventors: David J. Miedema, Ottawa (CA); Michael Watford, Kanata (CA); Xiaoqing Hu, Kanata (CA); Ross Caird, Kanata (CA); Rodd Lamarche, Ottawa (CA); Zenon Slodki, Ottawa (CA)

(73) Assignee: Ciena Corporation, Hanover, MD (US)

( * ) Notice: Subject to any disclaimer, the term of this patent is extended or adjusted under 35 U.S.C. 154(b) by 95 days.

(21) Appl. No.: 14/631,377

(22) Filed: Feb. 25, 2015

(65) Prior Publication Data

US 2016/0248510 A1  Aug. 25, 2016

(51) Int. Cl.
*H04B 10/11* (2013.01)
*H04B 10/27* (2013.01)
(Continued)

(52) U.S. Cl.
CPC .......... *H04B 10/27* (2013.01); *H04J 14/0227* (2013.01); *H04L 12/42* (2013.01);
(Continued)

(58) Field of Classification Search
CPC ..... H04B 10/27; H04L 41/0886; H04L 41/30; H04L 41/12; H04L 41/0809; H04L 12/42; H04J 14/0227
(Continued)

(56) References Cited

U.S. PATENT DOCUMENTS

| 6,775,479 B2 | 8/2004 | Milton et al. |
| 7,185,072 B2 | 2/2007 | Hada et al. |

(Continued)

FOREIGN PATENT DOCUMENTS

| EP | 1267519 A2 | 6/2002 |
| EP | 1267519 A3 | 6/2002 |

(Continued)

*Primary Examiner* — Juan A Torres (74) *Attorney, Agent, or Firm* — Clements Bernard Walker PLLC; Christopher L. Bernard; Lawrence A. Baratta, Jr.

(57) ABSTRACT

A method includes automatically detecting an association between members based on their relationship to one another; sharing topology and cluster information between the members; and determining roles for each member, based on the topology and cluster information and rules, wherein the roles are used to automatically provision at least one resource on each member, without user intervention. A method of configuring network devices sharing a pool of available resources is also described, wherein the network devices have management connectivity between one another through a plurality of point-to-point connections. The method includes, after a point-to-point connection in the management connectivity is formed based on cabling of associated network devices, determining a resource index number for each of the associated network devices; and uniquely assigning the resources from the pool to each of the network devices based on their respective resource index number.

16 Claims, 5 Drawing Sheets

(51) Int. Cl.
  *H04L 12/24* (2006.01)
  *H04J 14/02* (2006.01)
  *H04L 12/42* (2006.01)

(52) U.S. Cl.
  CPC ...... *H04L 41/0809* (2013.01); *H04L 41/0886* (2013.01); *H04L 41/12* (2013.01); *H04L 41/30* (2013.01)

(58) Field of Classification Search
  USPC .......................................................... 398/58
  See application file for complete search history.

(56) References Cited

U.S. PATENT DOCUMENTS

| | | | |
|---|---|---|---|
| 7,298,974 B2 | 11/2007 | Tanobe et al. | |
| 7,457,854 B2 | 11/2008 | Trisno et al. | |
| 7,643,468 B1 | 1/2010 | Arregoces et al. | |
| 7,725,603 B1 | 5/2010 | Kanevsky et al. | |
| 8,214,529 B2 | 7/2012 | Kanevsky et al. | |
| 8,396,952 B2 | 3/2013 | DeCusatis et al. | |
| 8,768,167 B2 | 7/2014 | Tanna et al. | |
| 2002/0126687 A1 | 9/2002 | Lindgren et al. | |
| 2009/0296719 A1 | 12/2009 | Maier et al. | |
| 2011/0262142 A1 | 10/2011 | Archambault | |
| 2012/0215874 A1 | 8/2012 | Sequeira et al. | |
| 2013/0108264 A1* | 5/2013 | deRuijter | H04Q 3/0083 398/45 |
| 2013/0279909 A1* | 10/2013 | Srinivas | H04B 10/27 398/58 |
| 2013/0330081 A1 | 12/2013 | Solheim et al. | |
| 2016/0156522 A1* | 6/2016 | Jubran | H04L 43/065 709/224 |

FOREIGN PATENT DOCUMENTS

| | | |
|---|---|---|
| EP | 2043379 A1 | 9/2008 |
| WO | 2014015909 A1 | 1/2014 |

* cited by examiner

AUTOMATIC CONFIGURATION OF NETWORK DEVICES IN A CLUSTER BASED ON PHYSICAL DEPLOYMENT

FIELD OF THE DISCLOSURE

The present disclosure relates generally to networking systems and methods. More particularly, the present disclosure relates to automatic configuration of network devices in a cluster based on physical deployment.

BACKGROUND OF THE DISCLOSURE

Installation and provisioning of network equipment, such as optical systems, is a complicated task, requiring expertise on behalf of installation personnel. Optical networking equipment is typically designed to be very flexible, allowing support for many different types of topologies and configurations by the same fundamental pieces of equipment. While this helps make the systems flexible in many different problem spaces, it also creates complexity with respect to provisioning and installing systems. As such, typical telecom installers develop expertise to deal with provisioning and installing systems.

For network equipment, systems typically include multiple cards, modules, blades, etc. ("cards") acting together, deployed in one or more chassis which group or couple cards together via a common backplane. All cards inserted into the chassis can be automatically organized and grouped together in a function based on the physical presence of the cards in the chassis. When more than one chassis is deployed to serve a function, the chassis are normally associated together by way of user provisioning actions during installation. In many cases, this involves provisioning of communication interfaces, to allow separate chassis to communicate, and then other information which allows the chassis to determine they are part of the same group.

In particular, systems without a physical backplane, i.e., the independent cards or other devices in a cluster, which are preferred for their modularity, lack a central management focus to organize the equipment and relate the equipment together based on the physical chassis the equipment is a part of. Normally the equipment needs to be manually configured to enforce this relationship and to allow the equipment to function as one entity in the cluster. For systems which include independent cards acting together, they may be physically connected into a common card used for a management interface and grouping function. This adds additional cost to the system as a "cluster controller" is needed to organize and manage the groups of cards. This also affects scalability and size of the cluster, since all cards must be physically connected to the same device. As described herein, independent cards can include "pizza boxes," integrated rack unit devices, or the like, i.e., systems without a backplane.

Other implementations for independent cards may have the cards connected as peers into a common communications infrastructure, or connected together in a common subnetwork. Even when the cards can be associated due to their presence in a common communications subnetwork, provisioning of the common cluster information and associating the cards together so they can perform test functions as a group requires some level of communication provisioning and cluster provisioning. Associating cards together requires additional hardware to enforce that association (e.g., backplane, cluster controller, etc.), or additional provisioning to make that association explicit (e.g., user provisioning). Additional hardware used to enforce the association adds additional cost to the network, as well as a single point of failure for the common management structure. Provisioning the association is time consuming, error prone, vendor specific, and labor intensive.

Thus, in typical telecommunication deployments, expertise is required on behalf of installation personnel. However, optical systems and other native telecommunications systems are moving into the data center, i.e., there is a merging of telecommunication and data-communication systems. For example, an optical system for data center interconnectivity can include multiple "pizza boxes" in a rack which requires cabling to a photonic shelf. The conventional approach to provisioning and configuration of such a system is error prone and time consuming, especially for data center personnel who typically have different expertise from telecom installers. The conventional approach requires manual provisioning steps for cabling, for explicitly setting wavelength values (for tunable transceivers), etc. It is possible for an administrator or installer to incorrectly choose a wavelength that is already in use unless the configuration has been properly tracked. Alternatively, a network wide management system would need to communicate with all the devices at the same time in order to determine proper wavelength assignments to avoid collisions or contention.

In view of the foregoing, it would be advantageous to provide automatic configuration of an optical system based on physical deployment, especially in the context of a data center or low-cost system deployment.

BRIEF SUMMARY OF THE DISCLOSURE

In an exemplary embodiment, a method of configuring members of a cluster of network equipment includes automatically detecting an association between the members based on their relationship to one another; sharing topology and cluster information between the members; and determining roles for each member, based on the topology and cluster information and rules, wherein the roles are used to automatically provision at least one resource on each member, without user intervention. Each member can be a network device that is physically separate from other members and can include management connectivity to the other members through one or more point-to-point connections. Optionally, each member can be a photonic device and the automatically provisioned at least one resource can be an assigned wavelength. The assigned wavelength for each member can be provided to an installer and used for fiber cabling to one of a multiplexer and a de-multiplexer. The association can be based on management connectivity in the cluster, and the management connectivity can include a plurality of point-to-point connections. The automatically detecting can be performed over available interfaces configured to determine the topology.

Optionally, the cluster has a linear topology, and the determining the roles can include a first member taking a lead role and all other members self-organizing in an order determined by connectivity to the first member. Alternatively, the determining the roles can include determining a lead role for one of the members based on a trigger, and all other members self-organizing in an order determined by connectivity to the member determined to have the lead role. Also, the cluster can have a ring topology, and the determining the roles can include determining a lead role for one of the members based on a trigger and all other members self-organizing in an order determined by connectivity to the member determined to have the lead role. Further, the cluster can have a ring topology with an extension, and the determining the roles can include a member connected to the extension taking a lead role and all other members self-organizing in an order determined by connectivity to the member determined to have the lead role. Additionally, the cluster can have a ring topology with a spur, and determining the roles can include determining a lead role for one of the members of the ring topology based on a trigger, and all other members in the ring topology self-organizing in an order determined by connectivity to the member determined to have the lead role. Further, the cluster can have two connected ring topologies, and determining the roles can include determining a lead role for one of the members of each ring and all other members, in each ring, self-organizing in an order determined by connectivity to the member determined to have the lead role.

In another exemplary embodiment, a method of configuring network devices sharing a pool of available resources is described, and the network devices have management connectivity between one another through a plurality of point-to-point connections. The method includes, after a point-to-point connection in the management connectivity is formed based on cabling of associated network devices, determining a resource index number for each of the associated network devices; and uniquely assigning the resources from the pool to each of the network devices based on their respective resource index number. Each network device can be physically separate from other network devices. Optionally, the network device can be a photonic device and the resources from the pool can be an assigned wavelength. The assigned wavelength for each network device can be provided to an installer and used for fiber cabling to one of a multiplexer and a de-multiplexer.

In a further exemplary embodiment, a network device configured to operate in a cluster with a plurality of network devices includes at least two management interfaces; and processing circuitry configured to: automatically detect an association between the plurality of network devices based on connectivity of the at least two management interfaces, share topology and cluster information between the plurality of network devices, and determine a role, based on the topology and cluster information and rules, wherein the role is used to automatically provision at least one resource on the network device, without user intervention. The network device can be physically separate from the plurality of network devices, with management connectivity to the plurality of network devices through one or more point-to-point connections. Optionally, the network device can be a photonic device and the automatically provisioned at least one resource can be an assigned wavelength. The assigned wavelength for the network device can be provided to an installer and used for fiber cabling to one of a multiplexer and a de-multiplexer.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, automatic configuration of network devices in a cluster is described based on physical deployment. The automatic configuration provides solutions to the problem of installing and testing an optical network, without any user provisioning. With the automatic configuration, manual configuration of the equipment is reduced or avoided. For example, pieces of equipment, operating together in a cluster, can self-organize and provide enough information to permit traffic tests during installation, with no user provisioning required. In an exemplary embodiment, a method includes automatically detecting membership in a cluster of equipment, sharing topology and cluster information to all discovered cluster members, and determining the proper roles of the discovered members in the cluster. Where there is ambiguity in the roles of the elements in the cluster, an action or additional piece of data can be supplied which can act as a trigger to select an element to act as an anchor in the cluster, a so-called lead role, and to determine the roles of the members of the cluster, which can self-organize based on connectivity to the member determined to have the lead role.

Once the roles have been determined, and there is no ambiguity between the physical topology and the desired configuration, the other elements in the cluster can automatically provision themselves with enough information that they can begin their own turn up and testing procedures. Advantageously, this is done with no user provisioning required, so that the installer, craftsperson, user, etc. on site does not need to be trained or responsible for the technical aspects of the initial turn up needed to get basic traffic flowing in the network. Thus, the automatic configuration provides quick installation of equipment on-site, with little or no training needed to provision the equipment. The automatic configuration easily associates independent cards together in the same cluster for management and operations, and quickly and automatically determines proper roles for members in a cluster, based on an initiated test action and the physical connectivity of the devices. That is, the automatic configuration uses available communication between otherwise independent devices to discover the physical topology. As described herein, the physical topology can be based on management connectivity between independent modules, cluster members, etc. As such, there is no need for specialized hardware to associate elements of a cluster together, and there is no need for explicit user provisioning on the equipment by an on-site craftsperson to determine the roles for each member in the cluster.

In another exemplary embodiment, to make the setup of multiple network devices quick, simple, and with minimal human installation errors, a method of connecting network devices is described which leverages the installation sequence in order to preconfigure resources, namely wavelengths or the like, for the subtending equipment in a deterministic and predictable manner. The installer can therefore follow this straightforward approach which is self-guiding, and therefore eliminates or minimizes errors. For example, in an optical system formed by multiple "pizza boxes", each box requires a couple of unique line side wavelengths. The automatic configuration leverages Ethernet connectivity between the boxes, which can be stacked or installed together in the same physical location, to communicate information between the boxes, for assignment of the resources. Thus, acting on that data exchange, each box could then automatically generate a predictable wavelength assignment for a subsequent fibering step which would greatly simply and speed up the installation of the system, such as in a data center.

For example, the multiple network devices can include an optical system, but each network device is independent, but connected to adjacent network devices via Ethernet. As each additional network device is physically connected into another network device within the group, an Ethernet daisy chain is used for the connection. The physical connection can enable a simple discovery protocol and algorithm to run, which then automatically preconfigures resources that will be used when connecting to each network device to subtending equipment (e.g., photonic equipment such as multiplexers/de-multiplexers).

In an exemplary embodiment, the connection between each network device is through one of two virtual Local Area Network (LAN) segments, and the messaging exchanges resource allocation information initiated by a head node does not require any additional manual configuration. The installer performing the installation can follow a simple sequence for the physical connection between the network devices and the subtending equipment, with the simple sequence causing configuration of the network devices. The benefit is that it enables quick and error free device setup without having to utilize any configuration management tools. An objective for data center products is to have very quick turn-up times with minimal interaction. This utilization of sequencing the physical network connections for the underlying resource allocation delivers a simple and reliable installation procedure that will fulfill customer expectations.

Figure 1:
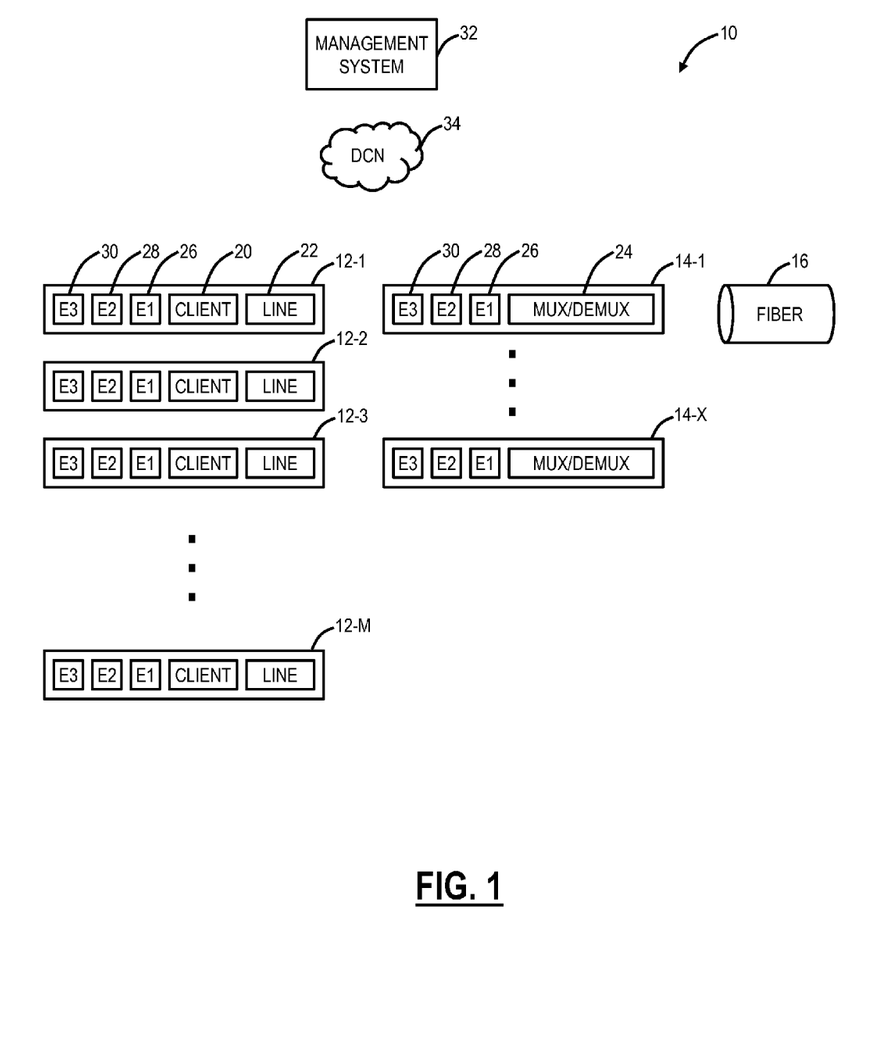
FIG. 1 is a block diagram of an exemplary optical system for the automatic configuration based on physical deployment.

Referring to FIG. 1, in an exemplary embodiment, a block diagram illustrates an exemplary optical system 10 for the automatic configuration based on physical deployment. The optical system 10 is presented for illustration purposes, and those of ordinary skill in the art will recognize the automatic configuration based on physical deployment could apply to other types of systems, nodes, network elements, clusters, etc. The optical system 10 includes various modules 12, 14 which are in separate form factors, but cabled together. That is, the modules 12, 14 can be pizza box form factors, independent cards, or the like. The optical system 10 is a cluster formed by the various modules 12, 14. In general, the automatic configuration based on physical deployment is based on how the modules 12, 14 are cabled together, i.e., their topology or association between one another. That is, the automatic configuration uses the physical deployment of the cluster to automatically configure and provision the modules 12, 14.

In an exemplary embodiment, the optical system 10 is a Wave Division Multiplexing (WDM) system which provides data connectivity between two sites via a fiber 16. FIG. 1 illustrates the associated equipment deployed at a first site. There would be corresponding equipment at a second site (not shown), connected by the fiber 16, to provide data connectivity between the two sites. The modules 12 are optical transceiver devices configured to take in one or more clients 20 and map/multiplex the clients 20 onto a line 22 which is at a specific WDM wavelength. The clients 20 can be any wavelength, protocol, or rate. For example, the client wavelength can be 850 nm, 1310 nm, 1550 nm, WDM, Coarse WDM, etc. The protocol can be Ethernet, Infiniband, Storage connectivity protocols such as ESCON, FICON, etc., video, or the like. Finally, the rate can be any rate up to the line rate. For example, the clients 20 can be 100 Gigabit Ethernet (100 GbE), although other embodiments are also contemplated. The line 22 is a specific wavelength, and can be tuned across a range of supported WDM wavelengths, e.g. at any wavelength on the ITU grid—ITU-T G.694.1, "Spectral grids for WDM applications: DWDM frequency grid" (02/12) (1528.77 nm to 1563.86 nm) or ITU-T G.694.2 "Spectral grids for WDM applications: CWDM wavelength grid" (12/03). The modules 12 can include circuitry configured to communicatively couple, map, and/or multiplex communications between the client 20 and the line 22. The optical system 10 can include a plurality of the modules 12, e.g., up to M modules (M is an integer). Thus, the optical system 10 can be viewed as a cluster of M modules 12, each of the modules 12 is independent from a hardware perspective, but collectively operated in the overall optical system 10.

The modules 14 are photonic modules including multiplexers/de-multiplexers 24. The modules 14 are configured to combine/split the WDM wavelengths from/to the line 22 and the fiber 16. In the example of FIG. 1, there are X modules 14, X is an integer ≥1. For example, the optical system 10 can include a single module 14 when all multiplexers/de-multiplexers 24 for the fiber 16 are included therein. For larger systems, such as 40 or more wavelengths, there may be multiple modules 14 to perform stages of multiplexing and de-multiplexing. Stated differently, there may be multiple modules when it is not practical to support fibering of all the line 22 connections on a single pizza box form factor. In an event, similar to the modules 12, the X modules 14 can be viewed as a cluster, each of the modules 14 is independent from a hardware perspective, but collectively operated in the overall optical system 10.

The objectives of the optical system 10 include 1) low-cost; 2) high-density; and 3) ease-of-use, operation, and installation. The low-cost and high-density aspects are covered by the modules 12, 14 being integrated form factors, i.e., no backplanes and associated overhead in terms of hardware and software complexity. It is an objective of the automatic configuration described herein to address the ease-of-use, operation, and installation. To that end, the automatic configuration can utilize physical cabling to determine the roles and assignment of resources, namely the wavelength assignment for the line 22.

From a cabling perspective in the optical system 10, there are two types of cabling performed for data connectivity and management connectivity. The data connectivity includes cabling the client 20 to subtending equipment (e.g., routers, switches, servers, storage devices, etc.), the line 22 to the multiplexers/de-multiplexers 24, and the multiplexers/de-multiplexers 24 to the fiber 16. That is, the data connectivity likely is fiber cabling; although electrical cabling is also contemplated for the clients 20. From a management perspective, the modules 12, 14 are all separate physically, i.e., no common backplane connectivity. The management connectivity can include Ethernet cabling or the like to physically connect the modules 12, 14 together to form a cluster. To that end, the modules 12, 14 can include Ethernet ports 26, 28, 30. Note, the three Ethernet ports 26, 28, 30 are shown for illustration purposes. Other embodiments are also contemplated, including have more or less Ethernet ports 26, 28, 30, as well as having integrated switching and/or bridging in the modules 12, 14 between the Ethernet ports 26, 28, 30. Note, the modules 12, 14 can include a processing circuitry or control circuitry communicatively coupled to the Ethernet ports 26, 28, 30. Thus, messaging received on any one of the Ethernet ports 26, 28, 30 can be processed by the processing circuitry or control circuitry, and/or relayed or forwarded on the other Ethernet ports 26, 28, 30.

With at least two of the Ethernet ports 26, 28, each of the modules 12 can be daisy chained together to form the management connectivity with a first and/or last of the modules 12 connected to a management system 32 via a Data Communications Network (DCN) 34. With the third Ethernet port 30, the first and the last modules 12 can be coupled together, to form a ring, and more than one of the modules 12 can be coupled to the DCN 34 and the management system 32, such as for redundancy. Also, the third Ethernet port 30 can allow for connectivity between the modules 12, 14. Those of ordinary skill in the art will recognize there a multitude of cabling options to create cluster topologies in the optical system 10.

In an exemplary embodiment, the automatic configuration provides automatic selection of a wavelength for each of the lines 22. The lines 22 can include a visual display on a front of the module 12 which indicate the selected wavelength, based on the techniques described herein for the automatic configuration. Based on this indication on the visual display, an installer can appropriately fiber the line 22 to the multiplexers/de-multiplexers 24 on the module 14. Note, typically multiplexers/de-multiplexers 24 are configured to transmit/receive a single wavelength in a wavelength grid.

Figure 2:
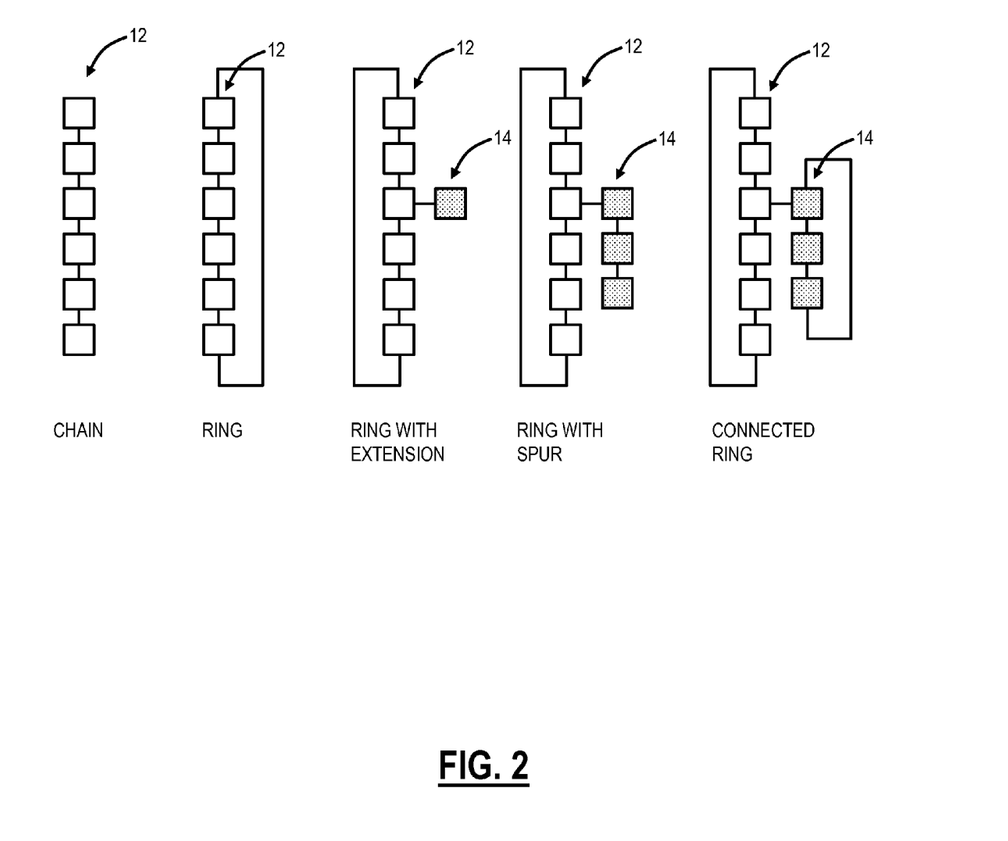
FIG. 2 is a block diagram of exemplary cluster topologies using the exemplary optical system of FIG. 1.

Referring to FIG. 2, in an exemplary embodiment, a block diagram illustrates exemplary cluster topologies using the exemplary optical system 10. Again, the automatic configuration utilizes physical cabling to determine the roles and assignment of resources, such as the wavelength assignment for the line 22. Note, the physical cabling also determines the associated cluster topology of the optical system 10. For the automatic configuration, a first aspect is automatic topology detection. Exemplary cluster topologies, formed by the modules 12, 14, can include a chain, a closed ring, or a meshed topology. In a chain topology, all members are of the same class (e.g., all are the modules 12) and have at most two connections between them (e.g., management connectivity to adjacent peers (physically and/or logically), with a first and a last member having only one connection). In a ring topology, all members are of the same class (e.g., all are the modules 12) and have exactly two connections between them (i.e., all members connected to peers, including the first and the last member). In topologies with extensions, groups of members can be joined together, but all members in the cluster with the same class are connected by no more than two connections. The extensions contemplate one of the modules 12 connecting to one of the modules 14, for example. Topologies of this type lend themselves to be self-arranging once the role of a member of a class in the cluster is known. Before the cluster can be self-arranging, it needs to have this cluster data shared between all members to check for inconsistencies.

Figure 3:
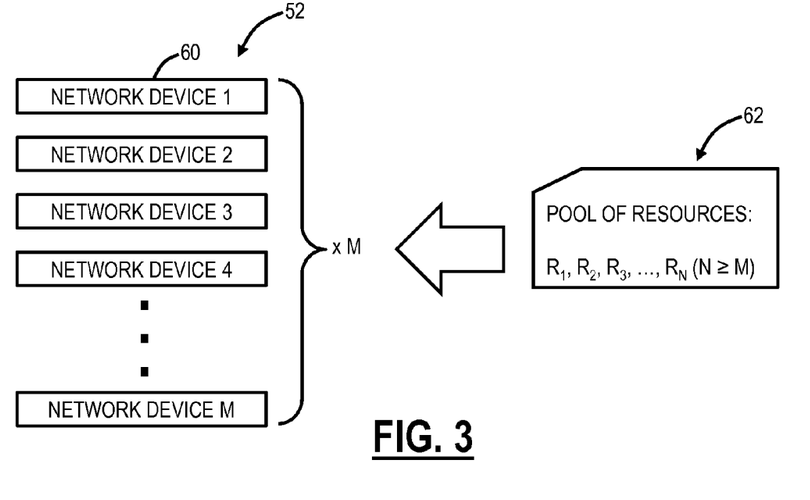
FIG. 3 is a block diagram of automatic configuration in a cluster.
Figure 4:
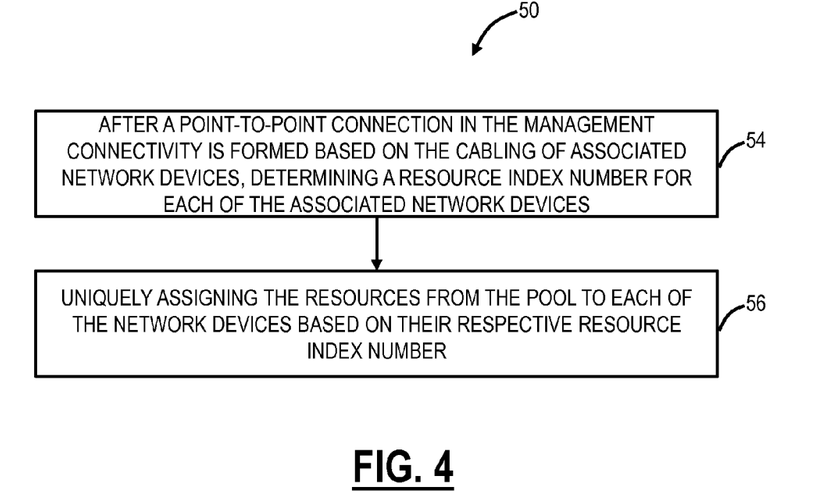
FIG. 4 is a flow chart of automatic configuration in the cluster of FIG. 3.

Referring to FIGS. 3 and 4, in an exemplary embodiment, a block diagram (FIG. 3) and a flow chart (FIG. 4) illustrate automatic configuration 50 of resources in a cluster 52. In FIG. 2, the cluster 52 includes up to M network devices 60. Again, the network devices 60 can be the modules 12, 14 or the like. There is a pool of resources 62 ($R_1, R_2, R_3, \ldots, R_N$ (N≥M)) associated with the network devices 60. The problem is how to assign the pool of resources 62 to the network devices 60 to avoid collisions, contention, etc. For example, the pool of resources 62 can be N wavelengths, each of the network devices 60 has to be on a separate and distinct wavelength. The pool of resources 62 can be other resources such as timeslots, bandwidth, etc. The objective of the automatic configuration 50 is to automatically assign and provision the pool of resources 62 based on the management connectivity in the cluster 52. That is, all of the network devices 60 (M of them) are aware of some pool of resources 62 (N of them, N≥M). Each network device 60 needs to allocate a resource from the pool of resources 62 without colliding with each other's allocation. This automatic configuration 50 provides a method of configuring network devices sharing a pool of available resources, wherein the network devices have management connectivity between one another through a plurality of point-to-point connections.

The automatic configuration 50 includes after a point-to-point connection in the management connectivity is formed based on the cabling of associated network devices, determining a resource index number for each of the associated network devices (step 54), and uniquely assigning the resources from the pool to each of the network devices based on their respective resource index number (step 56). That is, as the network devices 60 are cabled together to form the management connectivity, the unique resource is assigned and provisioned. Each network device 60 can be physically separate from other network devices 60. Optionally, the network device 60 is a photonic device and the resources from the pool is an assigned wavelength. The assigned wavelength for each network device 60 can be provided to an installer and used for fiber cabling to one of a multiplexer and a de-multiplexer.

Figure 5:
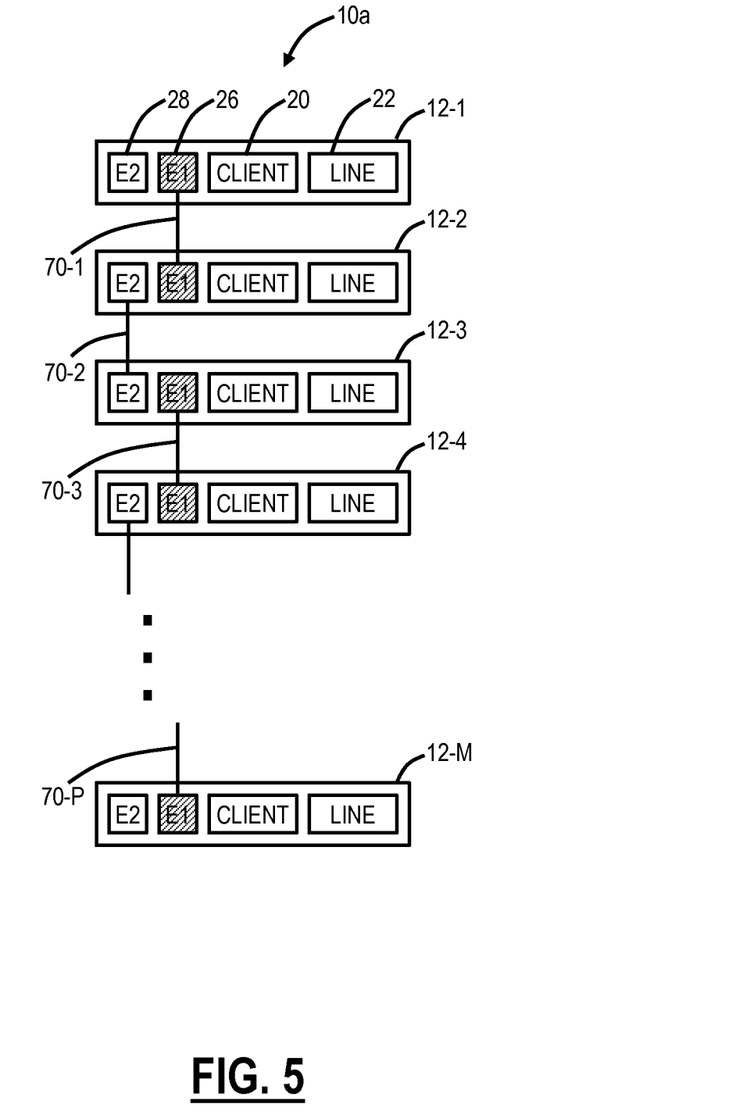
FIG. 5 is a block diagram of an exemplary operation of the automatic configuration of FIG. 4 in an optical system.

Referring to FIG. 5, in an exemplary embodiment, a block diagram illustrates an exemplary operation of the automatic configuration 50 in an optical system 10a. Here, the optical system 10a includes two Ethernet ports 26, 28 and the client 20 and the line 22 as described above. The optical system 10a is an exemplary chain or linear cluster topology. Again, the modules 12 or other network devices need to be configured and interconnected among themselves and to other subtending equipment, forming a cluster. The automatic configuration 50 leverages uses physical management connectivity with associated data exchange to help derive a topology configuration, with the resource allocation done responsive to the topology configuration to complete the equipment setup.

Again, each of the modules 12 (or any other network device) is physically co-located and interconnected using an Ethernet daisy chain, through the Ethernet ports 26, 28. Physically co-located means in a same office, building, etc., i.e., where the modules 12 are the same DCN. The automatic configuration 50 can be used to automatically assign and provision resources, namely wavelengths for the line 22 on each of the modules 12.

Each of the modules 12 (which can be referred to as a node, network device, or member) has two Ethernet ports 26, 28. There can be rules for the automatic configuration 50, such as the Ethernet port 28 is not connected to the first module 12-1, i.e., the first node or the head node of the stack or cluster. The Ethernet port 26 of the first module 12-1 is connected to the Ethernet port 26 of the second module 12-2 forming a connection 70-1, the Ethernet port 28 of the second module 12-2 is connected to the Ethernet port 28 of the third module 12-3 forming a connection 70-2, and so on.

For example, if there are M modules 12, for a chain cluster topology, there will be P connections 70, wherein P=M−1.

Concurrent with the cabling of the Ethernet ports 26, 28 between the modules 12, there can be messaging over the connections 70. For example, each of the connections 70 can have its own Virtual Local Area Network (VLAN) that is automatically provisioned once the associated connection 70 is cabled. Here, the module 12-1 initiates a message on the VLAN associated with the connection 70-1, declaring it has allocated resources $R_1$ (for example, the module 12-1 uses wavelength 1 for its line 22). The module 12-2, on receiving the message from module 12-1 via the VLAN associated with the connection 70-1, increments a resource index by one, allocates resources $R_2$ (for example, the module 12-2 uses wavelength 2 for its line 22), and then sends a new message onto its other VLAN associated with the connection 70-2 of the module 12-3. This process can be repeated for all of the modules 12-M. Any of the modules 12 in the chain, once it receives a message from one of the VLANs, will increment the resource index by one and send a new message on the alternate VLAN, which will contain the resource index it has allocated.

Again, in an exemplary embodiment, the optical system 10a can be a "pizza box" optical modem product which needs the "pizza boxes" (i.e., the modules 12) to be interconnected in a rack to one another for management connectivity. As well, the optical system 10a can needs to have the line 22 side fibers connected from each of the modules 12 to an appropriate multiplexers/de-multiplexers 24, such as in a module 14, for data connectivity. The automatic configuration 50 correlates the management connectivity and the data connectivity. This is advantageous and reduces installation and provisioning complexity since the line 22 is flexible, supporting tunability across various wavelengths, and it ensures no collisions or contention.

Figure 6:
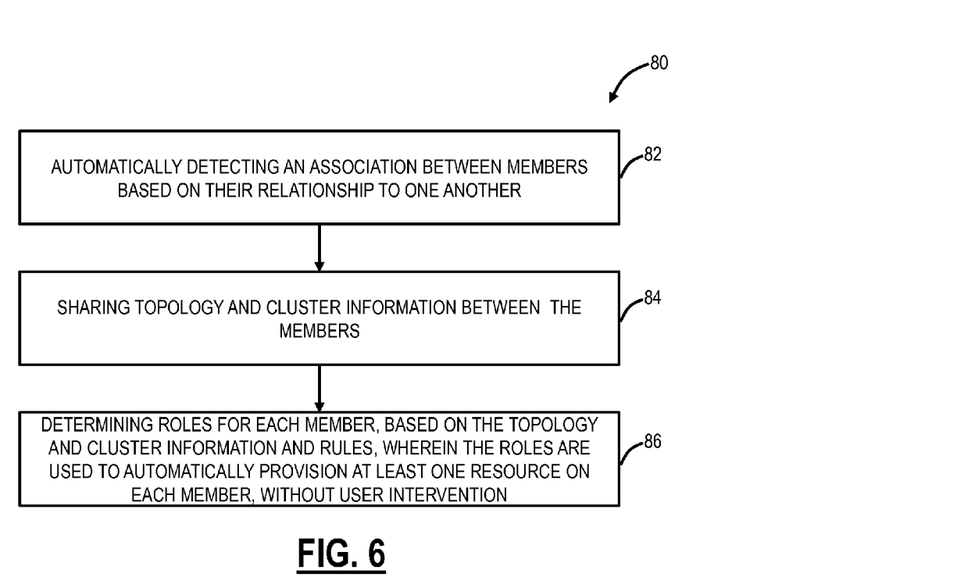
FIG. 6 is a flow chart of an automatic configuration process.

Referring to FIG. 6, in an exemplary embodiment, a flow chart of an automatic configuration process 80. The automatic configuration process 80 includes automatically detecting an association between members based on their relationship to one another (step 82); sharing topology and cluster information between the members (step 84); and determining roles for each member, based on the topology and cluster information and rules, wherein the roles are used to automatically provision at least one resource on each member, without user intervention (step 86). As described herein, topology relates to adjacency between members, i.e., who is connected to who, and cluster information relates to any other information that is shared between the members, such as, for example, member identification information, and the like.

Each member can be a network device that is physically separate from other members and includes management connectivity to the other members through one or more point-to-point connections. Optionally, each member can be a photonic device and the automatically provisioned at least one resource can be an assigned wavelength. The assigned wavelength for each member can be provided to an installer and used for fiber cabling to one of a multiplexer and a de-multiplexer. The association can be based on management connectivity in the cluster, and the management connectivity can include a plurality of point-to-point connections. The automatically detecting can be performed over available interfaces configured to determine the topology.

In an exemplary embodiment, the cluster has a linear topology, and the determining the roles can include a first member taking a lead role and all other members self-organizing in an order determined by connectivity to the first member. In another exemplary embodiment, the determining the roles can include determining a lead role for one of the members based on a trigger, and all other members self-organizing in an order determined by connectivity to the member determined to have the lead role. In a further exemplary embodiment, the cluster has a ring topology, and the determining the roles can include determining a lead role for one of the members based on a trigger and all other members self-organizing in an order determined by connectivity to the member determined to have the lead role. In still a further exemplary embodiment, the cluster has a ring topology with an extension, and the determining the roles can include a member connected to the extension taking a lead role and all other members self-organizing in an order determined by connectivity to the member determined to have the lead role. In still a further exemplary embodiment, the cluster has a ring topology with a spur, and determining the roles can include determining a lead role for one of the members of the ring topology based on a trigger, and all other members in the ring topology self-organizing in an order determined by connectivity to the member determined to have the lead role. In still a further exemplary embodiment, the cluster has two connected ring topologies, and the determining roles can include determining a lead role for one of the members of each ring and all other members, in each ring, self-organizing in an order determined by connectivity to the member determined to have the lead role.

Automatically detecting the association between members (e.g., the modules 12, 14) of a cluster of equipment is done by having each element communicate over available interfaces (e.g., the Ethernet ports 26, 28, 30) to discover basic information about neighbors. The association is the management connectivity between the members. This discovery can be done over a variety of protocols or methods, but the basic approach is to discover via broadcasting and/or messaging to and from neighboring equipment. This initial communication is only between adjacent neighbors, allowing discovery of a management connection to another cluster member and the identity of the cluster member.

The previous examples described herein presented the Ethernet ports 26, 28, 30 for the initial communication over the available interfaces. Other possible approaches to topology discovery in the cluster include any physical point-to-point messaging, using any protocol or connectivity technique, such as, without limitation, Address Resolution Protocol (ARP) requests over management interfaces, link discovery messaging over management interfaces, routing discovery protocols over management interfaces, optical connections, messaging over electrical connections, infrared transmitters and receivers, physical wiring from one element to another, Dynamic Host Configuration Protocol (DHCP) requests, etc. There are some specific configurations which are supported by this detection mechanism, and those are ones in which each member of a given class of equipment is only connected to a maximum of two other members of the same class.

Beyond the chain cluster topology, the members may be connected in a variety of ways (again, see FIG. 2 for some exemplary topologies), and simply discovering the connections between each member may not be enough to determine the configuration of the whole cluster. Note, this is not the case in the chain or linear topology, where the connectivity is sequenced, thus the first or head member node can be first assigned resources. In the various cluster topologies, the discovered information from each neighbor, will also be shared with all neighbors until all members of the cluster have the complete view of the cluster and the physical topology. In this manner, all members of the cluster have basic information from members of the cluster as well as the topology of the cluster, discovered over point-to-point connections.

In an exemplary embodiment, the members can use an append-and-forward technique over the point-to-point connections to notify all other neighbors of the topology and cluster information. Taking the example of FIG. 5, the module 12-1 communicates to the module 12-2 over the connection 70-1, advising the module 12-2 of the identity of the module 12-1. The module 12-2 communicates to the module 12-3 over the connection 70-2, providing its identity as well as information about the module 12-1, etc. That, through a series of messages over the various connections 70, which are all point-to-point, each module 12 can have a view of the overall topology of the optical system 10a. Of course, this process works as well in the other cluster topologies since the basic connection 70 is point-to-point in all of the topologies. The key to building the cluster topology is to know the identities of all other members and how the connections 70 are physically formed. Other embodiments for sharing the topology are also contemplated. For example, whenever a new member is added to the cluster, the information can be flooded on every point-to-point connection.

Once the topology is determined and verified as proper type by way of data sharing, a role can be selected from a shared table of possible roles. As described herein, the role is used to assign resources to the members. This shared table contains rules about how the physical topologies can be connected, and what a position in the topology can imply. When no roles are known in the cluster, this data cannot be used, since a seed is needed to start the discovery process. For example, in a ring, all members are essentially equal. Any member in a ring can be in any position in the topology as long as it is connected with the rules that the topology expects.

The next piece of data is a trigger which solidifies which of the available options is correct in the context of the shared topology. Some example triggers include, without limitation:

A physical trigger on a front of the module 12, 14 (e.g., push a button);

Detecting a neighboring router or switch on a client port, and contacting a central server (e.g., the management system) to associate the member with an expected connection;

A presence of an action which determines a role (e.g., the first member to see incoming light on an input port, the first element to have a pluggable module inserted, the first element to receive a packet on an interface, etc.);

A conflict resolving voting mechanism (e.g., the lowest Media Access Control (MAC) address in the cluster, node ID, etc.); and A configuration specific difference that selects between members in the group (e.g., the element which is connected to another device or communication network).

That is, the trigger is determinative of an ordering of the roles, where there may be a conflict. There may be some topologies, such as the linear or chain topology, which have no conflicting rules so they may come up without requiring a trigger. Again, here there is a definitive order—the head member is first, etc. based on the management connectivity. Stated differently, in a linear or chain topology, either member which is not connected to another device on a given interface may be designated for the first role (i.e., the first or last member).

Once a trigger is used to force selection of one element in the group into a particular location in the topology, and if this selection does not violate the rules of the topology, other members in the topology may have enough information to automatically determine their role in the topology and to self-configure. That is, once the leader or first member is selected, there can be an ordered, self-configuration. Again, this ordered, self-configuration can be used to select the resources, such as wavelength assignment.

Figure 7:
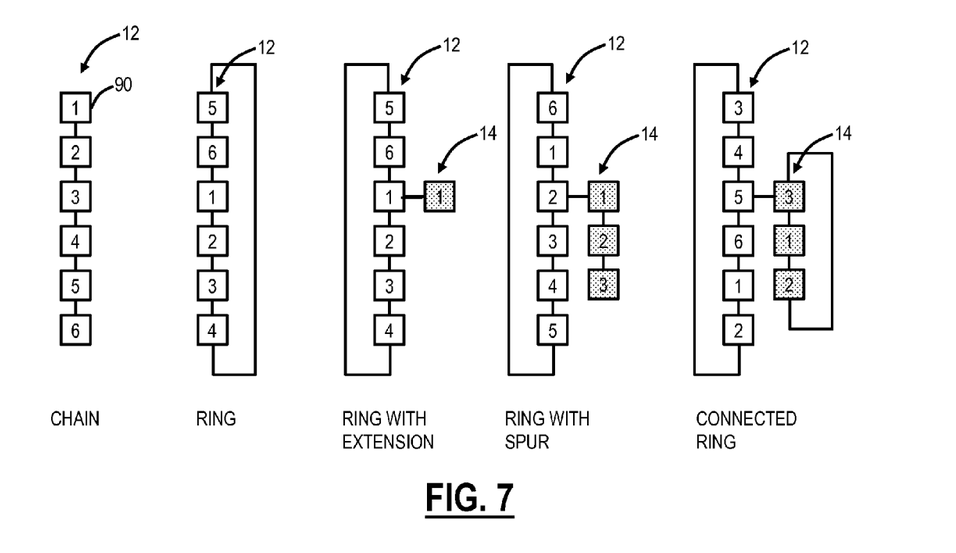
FIG. 7 is a block diagram of the exemplary cluster topologies from FIG. 2 for exemplary operation of the automatic configuration process of FIG. 6.

Referring to FIG. 7, in an exemplary embodiment, a block diagram illustrates the exemplary cluster topologies from FIG. 2 for exemplary operation of the automatic configuration process 80. Here, in FIG. 7, each member 90 has a number included which indicates its role/resource assignment, etc. The key to the self-organization in the automatic configuration process 80 is that some member has to be the lead such that the others can fall behind, to self-organize, based on the management connectivity.

First, for the chain topology, the chain can self-organize without any trigger, since there is only one set of rules that the topology can match to—the member which has no "upward" connect must be a first role in the cluster. All others take a role based on their connection in the first and self-organize in that order, based on the management connectivity. The ring requires a trigger since all members are equal, i.e., a ring is equivalent to a round table—there is no head seat. In this example in FIG. 7, the third member is triggered to become the first member, from a role perspective, and all other members self-organize from the rules of the configuration. The third member is selected based on the aforementioned triggers, and the remaining members fall in place, based on the management connectivity to the third member.

The ring with the extension does not necessarily require a trigger, since a rule in the configuration can include that the member from the modules 12 which is connected to a member from the modules 14, via the management connectivity, must be the first role, and all others self-organize from that trigger. The ring with the spur in this example requires a trigger since no rule forces the proper conditions for self-organization in the ring for the modules 12. For example, the second member is selected to be lead role, and all others organize themselves accordingly. In the chain of the modules 14, no trigger is needed since it is a chain topology. In the interconnected rings example, two triggers are required to drive the full organization. Note, the foregoing discussion in FIG. 7 is about selecting the lead role. Again, the lead role is used to determine automatic resource allocation, such as wavelength assignment or the like.

Note that the self-organization may need to be fluid and changeable as the installation progresses and the topology changes. However, at a certain point in the installation process, once all testing has been done, the configuration must be locked or committed. Of course, manual configuration is also contemplated, using the automatic configuration as a guide that can be accepted or modified for each of the members. This can be done via an interaction by a skilled technician trained in a more detailed installation. Also, the module 12 can include selections on the faceplate, via a craft interface, mobile device, etc. Again, the line 22 can visually display the selected wavelength based on the automatic configuration, providing notification of proper fiber cabling of the line 22. Also, the selected wavelength can be overridden and moved to another wavelength. Such a manual change can also flow through to the other members, if required to avoid collision or contention.

The automatic configuration removes the need for provisioning and interaction with the device by the installation technician. After the configuration has been tested and locked, further changes to the topology of the existing members of the cluster may not automatically be acted on. However, if additional members are added to a locked and committed configuration, they will self-discover their role in the cluster and configure themselves based on the shared configuration information.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of configuring members of a cluster of network equipment, the method comprising:
    automatically detecting an association between the members based on their relationship to one another;
    sharing topology and cluster information between the members;
    determining roles for each member, based on the topology and cluster information and rules; and
    automatically provisioning at least one resource on each member based on a determined role, without user intervention, wherein the at least one resource comprises an assigned wavelength that is automatically assigned based on a determined role of each member.

2. The method of claim 1, wherein each member is a network device that is physically separate from other members and includes management connectivity to the other members through one or more point-to-point connections.

3. The method of claim 1, wherein each member is a photonic device.

4. The method of claim 1, wherein the association is based on management connectivity in the cluster, and the management connectivity comprising a plurality of point-to-point connections.

5. The method of claim 1, wherein the automatically detecting is performed over available interfaces configured to determine the topology.

6. The method of claim 1, wherein the cluster has a linear topology, and the determining the roles comprises a first member taking a lead role and all other members self-organizing in an order determined by connectivity to the first member.

7. The method of claim 1, wherein the determining the roles comprises determining a lead role for one of the members based on a trigger, and all other members self-organizing in an order determined by connectivity to the member determined to have the lead role.

8. The method of claim 1, wherein the cluster has a ring topology, and the determining the roles comprises determining a lead role for one of the members based on a trigger and all other members self-organizing in an order determined by connectivity to the member determined to have the lead role.

9. The method of claim 1, wherein the cluster has a ring topology with an extension, and the determining the roles comprises a member connected to the extension taking a lead role and all other members self-organizing in an order determined by connectivity to the member determined to have the lead role.

10. The method of claim 1, wherein the cluster has a ring topology with a spur, and determining the roles comprises determining a lead role for one of the members of the ring topology based on a trigger, and all other members in the ring topology self-organizing in an order determined by connectivity to the member determined to have the lead role.

11. The method of claim 1, wherein the cluster has two connected ring topologies, and determining the roles comprises determining a lead role for one of the members of each ring and all other members, in each ring, self-organizing in an order determined by connectivity to the member determined to have the lead role.

12. The method of claim 3, wherein the assigned wavelength for each member is used for fiber cabling to one of a multiplexer and a de-multiplexer.

13. A network device configured to operate in a cluster with a plurality of network devices, the network device comprising:
    at least two management interfaces; and
    processing circuitry configured to
        automatically detect an association between the plurality of network devices based on connectivity of the at least two management interfaces,
        share topology and cluster information between the plurality of network devices,
        determine a role, based on the topology and cluster information and rules, and
        automatically provision at least one resource on each member based on a determined role, without user intervention, wherein the at least one resource comprises an assigned wavelength that is automatically assigned based on a determined role of each member.

14. The network device of claim 13, wherein the network device is physically separate from the plurality of network devices, with management connectivity to the plurality of network devices through one or more point-to-point connections.

15. The network device of claim 13, wherein the network device is a photonic device and the automatically provisioned at least one resource is an assigned wavelength.

16. The network device of claim 15, wherein the assigned wavelength for the network device is used for fiber cabling to one of a multiplexer and a de-multiplexer.

* * * * *